(12) United States Patent
Wang et al.

(10) Patent No.: US 7,806,571 B2
(45) Date of Patent: Oct. 5, 2010

(54) STREETLIGHT SYSTEM

(75) Inventors: Chun-Wei Wang, Miao-Li Hsien (TW); Wen-Jang Jiang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/242,580

(22) Filed: Sep. 30, 2008

(65) Prior Publication Data

US 2009/0154146 A1 Jun. 18, 2009

(30) Foreign Application Priority Data

Dec. 12, 2007 (CN) .................. 2007 1 0203000

(51) Int. Cl.
*F21V 33/00* (2006.01)
(52) U.S. Cl. .................. 362/431; 362/802; 362/249.02
(58) Field of Classification Search ................. 362/802, 362/431, 249.02
See application file for complete search history.

(56) References Cited

U.S. PATENT DOCUMENTS

| | | | |
|---|---|---|---|
| 2002/0154218 A1* | 10/2002 | Loyd et al. .................. | 348/151 |
| 2003/0117803 A1 | 6/2003 | Chen | |
| 2004/0064218 A1* | 4/2004 | Schanin et al. .............. | 700/286 |
| 2005/0174762 A1* | 8/2005 | Fogerlie ..................... | 362/183 |
| 2006/0055248 A1* | 3/2006 | Archdekin et al. .......... | 307/139 |
| 2007/0014119 A1* | 1/2007 | Burkett ....................... | 362/459 |

FOREIGN PATENT DOCUMENTS

| | | |
|---|---|---|
| CN | 2754310 Y | 1/2006 |
| DE | 102007007031 A1 | 8/2007 |
| JP | 2005-251724 A | 9/2005 |
| JP | 2007-280735 A | 10/2007 |

* cited by examiner

*Primary Examiner*—Laura Tso
(74) *Attorney, Agent, or Firm*—Andrew C. Cheng

(57) ABSTRACT

An exemplary streetlight system for illuminating a road surface comprises an illuminating device, an infrared detection device and a controlling device. The illuminating device includes a light source. The infrared detection device is configured for detecting whether there are vehicles or passersby on the road surface and generating a detection signal. The controlling device is configured for receiving the detection signal, generating a controlling signal according to the detection signal and sending the controlling signal to the light source, thereby modulating the brightness of the light source.

3 Claims, 2 Drawing Sheets

STREETLIGHT SYSTEM

BACKGROUND

1. Technical Field

The present invention generally relates to streetlight systems, particularly, to a streetlight system employing light emitting diode as light source.

2. Discussion of Related Art

Nowadays, gas discharge lamps have been used extensively as light sources for streetlights due to their high brightness.

However, the gas discharge lamps have long response time. When electrified, a streetlight employing gas discharge lamps usually needs to be preheated for a period of time before working. Additionally, the gas discharge lamps have extremely high energy consumption during working time.

Therefore, what is needed is a streetlight system that has short response time and low energy consumption.

SUMMARY

A streetlight system for illuminating a road surface, in accordance with a present embodiment, is provided. The streetlight system comprises an illuminating device, an infrared detection device and a controlling device. The illuminating device includes a light source for selectively providing a lower illumination brightness or a higher illumination brightness. The infrared detection device is configured for detecting a vehicles or a passerby on the road surface and generating a detection signal associated therewith. The controlling device is configured for controlling the light source to provide the higher illumination brightness according to the detection signal.

Detailed features of the present streetlight system will become more apparent from the following detailed description and claims, and the accompanying drawings.

BRIEF DESCRIPTION OF THE DRAWINGS

Many aspects of the present streetlight system can be better understood with reference to the following drawings. The components in the drawings are not necessarily drawn to scale, the emphasis instead being placed upon clearly illustrating the principles of the present streetlight system. Moreover, in the drawings, like reference numerals designate corresponding parts throughout the several views, wherein.

DETAILED DESCRIPTION OF THE PREFERRED EMBODIMENTS

Reference will now be made to the drawings to describe the embodiments of the present streetlight system, in detail.

Figure 1:
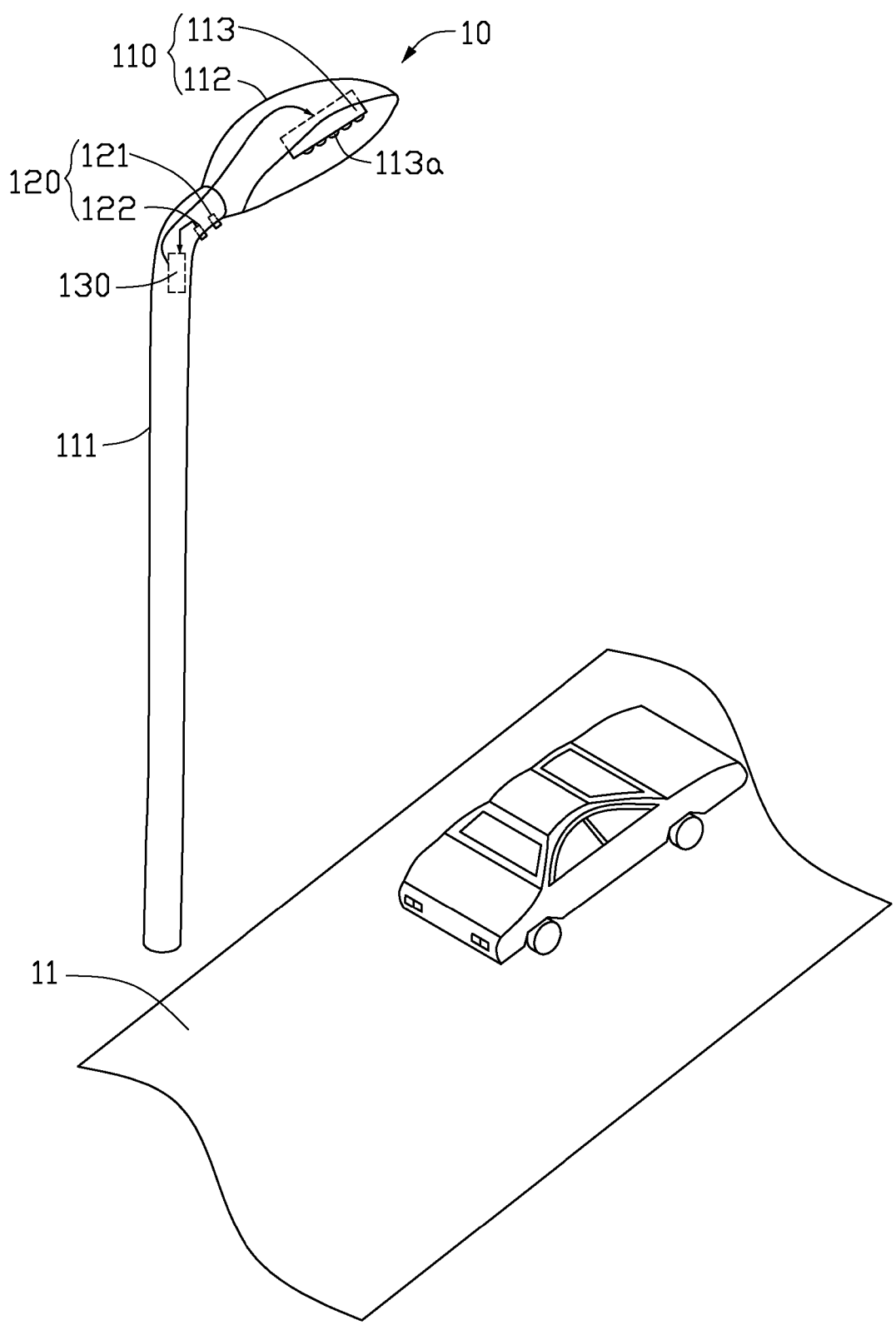
FIG. 1 is a schematic isometric view of a streetlight system, according to a first exemplary embodiment.

Referring to FIG. 1, a streetlight system 10 for illuminating a road surface 11, according to a first exemplary embodiment is provided. The streetlight system 10 includes an illuminating device 110, an infrared detection device 120, and a controlling device 130.

The illuminating device 110 includes a shell 112, and a light source 113 received in the shell 112. The light source 113 is for selectively providing a lower illumination brightness or a higher illumination brightness. In this embodiment, the light source 113 includes a plurality of light emitting diodes 113a.

The infrared detection device 120 is configured for detecting a vehicle or passerby on the road surface 11, and generating a detection signal associated therewith.

In this embodiment, the infrared detection device 120 includes an infrared light emitting module 121 and an infrared sensing module 122. The infrared light emitting module 121 is configured to emit infrared light towards the road surface 11. The infrared sensing module 122 is configured for sensing infrared light reflected by the vehicles or the passersby on the road surface 11. The infrared detection device 120 is configured for generating a detection signal if the infrared light reflected by the vehicles or passersby is sensed by the infrared sensing module 122, and sending the detection signal to the controlling device 130. In this exemplary embodiment, the infrared light emitting module 121 includes at least one infrared light emitting diode for emitting infrared light. The infrared light emitting module 121 can further comprises a pulse driving circuit for driving the at least one infrared light emitting diode.

The controlling device 130 is capable of receiving the detection signal, generating a controlling signal associated with the detection signal, and sending the controlling signal to the light source 113, thereby controlling the light source 113 to provide the higher illumination brightness according to the detection signal.

In this embodiment, the controlling device 130 is electrically connected to the infrared detection device 120 and the light source 113. The controlling device 130 is capable of controlling the state (lit or not) of the light emitting diodes 113a. When all of the light emitting diodes 113a are lit, the light source 113 works with the higher illumination brightness. When half of the light emitting diodes 113a or less are lightened, the light source 113 works with the lower illumination brightness.

Furthermore, the streetlight system 10 includes a supporting shaft 111 on a side of the road surface 11. The shell 112 is arranged at an end portion of the supporting shaft 111 and above the road surface 11, thereby the light source 113 received in the shell 112 is capable of illuminating the road surface 11. The infrared detection device 120 is arranged on the supporting shaft 111.

It is to be understood that, in foggy or misty weather, the moisture dispersed in the atmosphere can also reflect infrared light emitted by the infrared light emitting module 121. Thereby, the controlling device 130 modulates the light source 113 to work with the higher illumination brightness, according to whether the detection device 120 has received infrared light reflected by the moisture.

Figure 2:
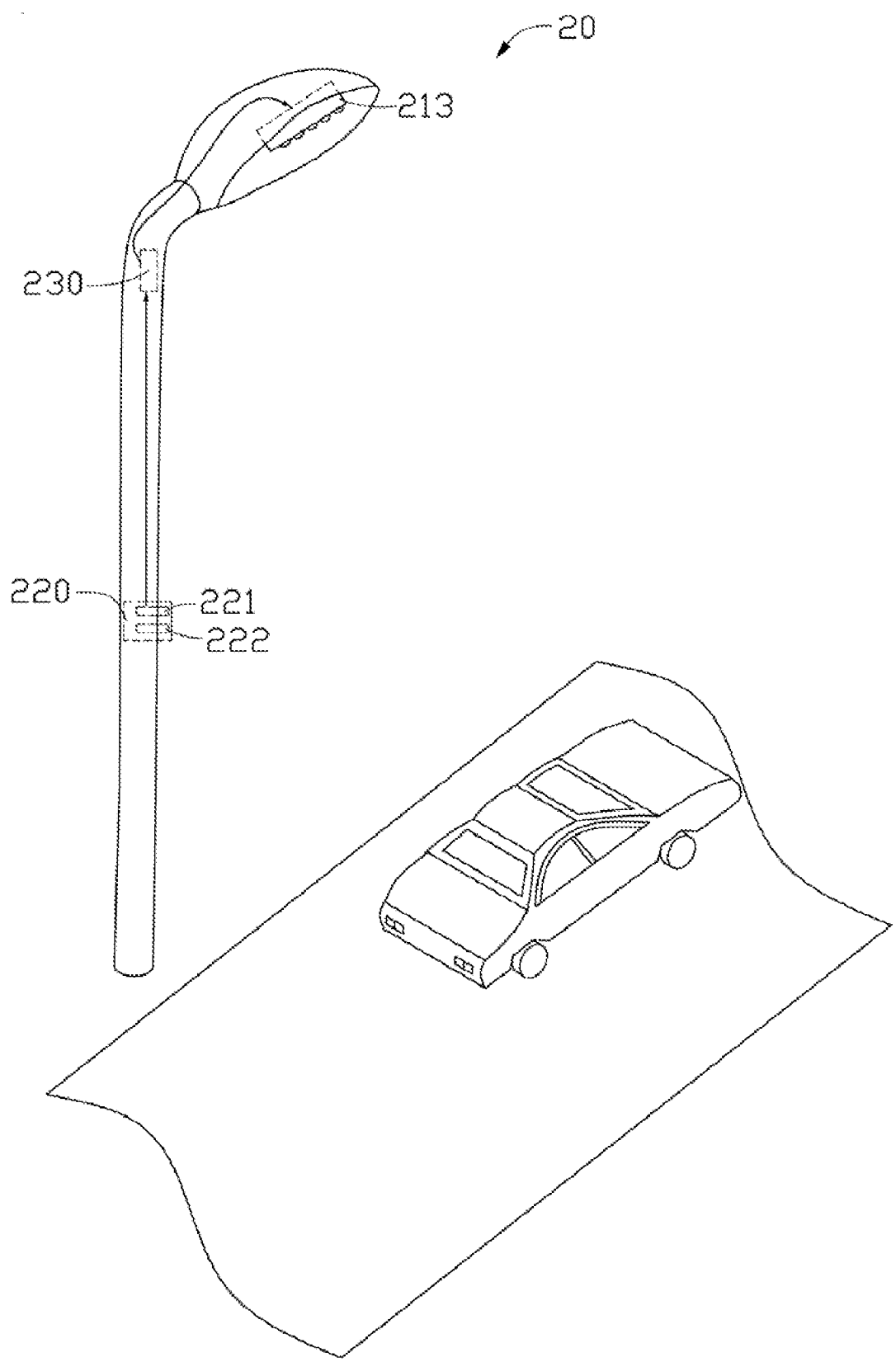
FIG. 2 is a schematic isometric view of a streetlight system, according to a second exemplary embodiment.

Referring to FIG. 2, a streetlight system 20 according to a second exemplary embodiment is provided. The streetlight system 20 has a configuration similar to the streetlight system 10. The streetlight system 20 also includes a light source 213, an infrared detection device 220 and a controlling device 230.

The difference is that, the infrared detection device 220 includes an environmental temperature measuring module 222 and an infrared temperature sensing module 221. The environmental temperature measuring module 222 is configured for measuring the temperature $T_a$ of current environment. The infrared temperature sensing module 221 is configured for sensing the temperature $T_b$ of the atmosphere around the road surface 11. In this embodiment, the environmental temperature measuring module 222 includes a heat responsive element and a temperature measuring circuit (not illustrated). The heat responsive element has a resistance variable according to the environmental temperature. The temperature measuring circuit is electrically connected to the controlling device for measuring the environmental temperature according to the resistance of the heat responsive element.

When there is vehicle or passersby passing through the road surface 11, the vehicle exhausts or the body temperature of the passersby will cause the temperature $T_b$ of the atmosphere around the road surface 11 to rise so that $T_b$ becomes greater than $T_a$. Then, the infrared detection device 220 generates a detection signal represents that there is vehicle or passersby on the road surface 11. The controlling device 230 receives the detection signal, generates a corresponding first controlling signal according to the detection signal, and sends the first controlling signal to the light source 213, and the light source 213 is controlled to operate at the higher illumination brightness.

When there is no vehicle or passersby passing through the road surface 11, the temperature $T_b$ of the atmosphere around the road surface 11 is generally equal to the environmental temperature, and the infrared detection device 220 generates a detection signal represents that there is no vehicle or passersby on the road surface 11. The controlling device 230 receives the detection signal, generates a corresponding second controlling signal according to the detection signal, and sends the second controlling signal to the light source 213, and the light source 213 is controlled to operate at low brightness.

It is to be understood that, the environmental temperature measuring module 222 can also be some other kind of module for sensing temperature.

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. A streetlight system for illuminating a road surface, comprising:

an illuminating device having a light source for selectively providing a lower illumination brightness or a higher illumination brightness;

an infrared detection device configured for detecting a vehicle or a passerby on the road surface and generating a detection signal associated therewith; and a controlling device configured for controlling the light source to provide the higher illumination brightness according to the detection signal, wherein the light source comprises a plurality of light emitting diodes, the light emitting diodes are connected in a manner such that only part of the light emitting diodes can be switched on to provide the lower illumination brightness and all of the light emitting diodes are switched on to provide the higher illumination brightness.

2. A streetlight system for illuminating a road surface, comprising:

an illuminating device having a light source for selectively providing a lower illumination brightness or a higher illumination brightness;

an infrared detection device configured for detecting a vehicle or a passerby on the road surface and generating a detection signal associated therewith; and a controlling device configured for controlling the light source to provide the higher illumination brightness according to the detection signal, wherein the infrared detection device comprises an environmental temperature measuring module and an infrared temperature sensing module, the environmental temperature measuring module being configured for measuring an environmental temperature, the infrared temperature sensing module being configured for sensing the temperature of the atmosphere around the road surface, the infrared detection device generating the detecting signal if the temperature of the atmosphere around the road surface is higher than the environmental temperature, the controlling device configured for generating a controlling signal to control the light source to provide the higher illumination brightness.

3. The streetlight system according to claim 2, wherein the environmental temperature measuring module comprises a heat responsive element and a temperature measuring circuit, the heat responsive element has a resistance variable according to the environmental temperature, the temperature measuring circuit being electrically connected to the controlling device for measuring the environmental temperature according to the resistance of the heat responsive element.

* * * * *